(12) United States Patent  (10) Patent No.: US 7,445,577 B2
Urabe  (45) Date of Patent: Nov. 4, 2008

(54) INTERNALLY GEARED HUB BALL PUSHING UNIT

(75) Inventor: Hiroyuki Urabe, Sakai (JP)

(73) Assignee: Shimano Inc., Osaka (JP)

( * ) Notice: Subject to any disclaimer, the term of this patent is extended or adjusted under 35 U.S.C. 154(b) by 402 days.

(21) Appl. No.: 11/448,018

(22) Filed: Jun. 7, 2006

(65) Prior Publication Data
US 2007/0045080 A1 Mar. 1, 2007

(30) Foreign Application Priority Data
Jul. 29, 2005 (JP) ............................. 2005-220754

(51) Int. Cl.
 *F16H 57/00* (2006.01)
(52) U.S. Cl. ..................................... 475/331
(58) Field of Classification Search ................ None
See application file for complete search history.

(56) References Cited

U.S. PATENT DOCUMENTS 2,291,485 A * 7/1942 Musselman ................. 475/314
2,799,872 A * 7/1957 Krahnke ..................... 408/129
6,988,973 B2 * 1/2006 Steuer ........................ 475/329

FOREIGN PATENT DOCUMENTS

| EP | 0-383-350 B1 | 6/1995 |
|----|--------------|--------|
| EP | 1 249 389 A2 | 10/2002 |
| GB | 2 251 276 A | 7/1992 |
| JP | 11 020771 A | 1/1999 |
| JP | 2930315 | 5/1999 |
| JP | 3184230 | 4/2001 |
| JP | 31 842302 B2 | 7/2001 |

* cited by examiner

*Primary Examiner*—Sherry Estremsky
(74) *Attorney, Agent, or Firm*—Global IP Counselors, LLP

(57) ABSTRACT

An internally geared hub ball pushing unit is configured to be mounted on a hub axle such that is less likely to experience a decrease in bearing durability resulting from deformation of the ball pushing surface. The ball pushing unit is provided with an inside member and an outside member. The inside member has a fitting part configured to be fitted onto the hub axle with a sleeve insertion recess disposed on its internal circumferential portion and an externally threaded or splined section disposed on its external circumferential portion. The outside member has a ball pushing surface on its external circumferential portion and an internally threaded or splined section configured to non-rotatably connect to the externally threaded section.

20 Claims, 6 Drawing Sheets

INTERNALLY GEARED HUB BALL PUSHING UNIT

CROSS-REFERENCE TO RELATED APPLICATIONS

This application claims priority under 35 U.S.C. § 119 to Japanese Patent Application No. 2005-220754. The entire disclosure of Japanese Patent Application No. 2005-220754 is hereby incorporated herein by reference.

BACKGROUND OF THE INVENTION

1. Field of the Invention

This invention generally relates to a ball pushing unit. More specifically, the present invention relates to an internally geared hub ball pushing unit configured to be mounted on a hub axle and comprising a circular arc-shaped fitting part configured to be fitted onto a hub axle, an operating body insertion recess that has the shape of a circular arc and is configured such that a gear change operating body serving to facilitate gear change operations can be inserted therein and turned there-within, and a ball pushing surface configured and arranged to contact a ball of a bearing.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle drive train.

Internally geared hubs for bicycles generally have a driver on which a sprocket is mounted and a hub shell arranged and configured to receive power from the driver. Such internally geared hubs employ bearings to rotatably support the hub shell on the driver and the hub axle. Each bearing basically comprises a ball pushing unit serving as an inner race that has a cone shaped ball pushing surface on an external circumferential surface thereof and is configured to screw onto the hub axle, a ball bearing unit serving as an outer race that has a cone-shaped ball bearing surface on an inner circumferential portion thereof and is provided on the driver or hub axle, and spherical bodies (balls) arranged between the ball pushing unit and the ball bearing unit in such a fashion as to contact both. Some internally geared hubs have a sleeve-like gear change operating body for executing gear change operations mounted rotatably on the external circumferential surface of the hub axle (for example, see Japanese Patent No. 3184230). The gear change operating body is arranged to rotate integrally with a cable anchoring body that is arranged such that the ball pushing unit is disposed between the cable anchoring body and the gear change operating body. The gear change operating body is configured to control the on-off status of a plurality of clutches at each rotational phase and thus must be arranged at a prescribed position in the circumferential direction. Consequently, the ball pushing unit is not mounted on the hub axle with a screw connection and, instead, is mounted in such a fashion that it cannot rotate but can move axially with respect to the hub axle. In order to configure the ball pushing unit such that the gear change operating body can be passed there-through toward the cable anchoring body and turned there-within, the internal circumferential surface of the ball pushing unit has a pair of circular arc-shaped operating body insertion recesses and a pair of circular arc-shaped fitting parts that is arranged between the pair of operating body insertion recesses and configured to fit onto the external circumferential surface of the hub axle. In a ball pushing unit having operating body insertion recesses formed in the internal circumferential surface thereof, the wall thickness of the ball pushing unit is smaller at the portion where the operating body insertion recesses are formed than at the portion where the fitting parts are formed. Consequently, the wall thickness varies along the circumferential direction more than in the case of a ball pushing unit that screws onto the hub axle. The pressure with which the ball pushing unit presses against the balls of the bearing is adjusted by tightening and loosening a nut member arranged on the axially outward facing side of the cable anchoring body.

With the conventional ball pushing unit provided with operating body insertion recesses described above, warping (deformation) of the ball pushing unit sometimes occurs when the nut member is tightened in order to adjust the pressure with which the ball pushing unit presses against the balls of the bearing. Since the wall thickness of the ball pushing unit varies along the circumferential direction when viewed in a side cross sectional view lying in plane perpendicular to the hub axle, when the ball pushing unit warps, the ball pushing surface deviates from its original circular shape such that the ball pushing surface becomes oval in the cross sectional view. As a result, there is the possibility that the durability (service life) of the bearing will decline.

In view of the above, it will be apparent to those skilled in the art from this disclosure that there exists a need for an improved internally geared hub ball pushing unit. This invention addresses this need in the art as well as other needs, which will become apparent to those skilled in the art from this disclosure.

SUMMARY OF THE INVENTION

One object of the present invention is to provide an internally geared hub ball pushing unit that is less likely to experience a decrease in bearing durability resulting from deformation of the ball pushing surface.

The foregoing objects can basically be attained by providing an internally geared hub ball pushing unit in accordance with a first aspect of the present invention that is configured to be mounted on a hub axle. The internally geared hub ball pushing unit in accordance with a first aspect of the present invention basically comprises an inside member and an outside member. The inside member includes an annular fitting part configured to be fitted onto a hub axle, an operating body insertion recess disposed on an internal circumferential portion of the inside member and a first connecting part disposed on an external circumferential portion of the inside member. The operating body insertion recess has a circular arc shape and is configured to receive a gear change operating body serving to facilitate gear change operations. The outside member has a ball pushing surface disposed on an external circumferential portion of the outside member to contact a spherical body of a bearing and a second connecting part disposed on an internal circumferential portion of the outside member. The second connecting part of the outside member is non-rotatably connected to the first connecting part of the inside member.

With this ball pushing unit, the inside member having the fitting part and the operating body insertion recess on an internal circumferential portion thereof is fitted onto the hub axle and the outside member having the ball pushing surface is connected non rotatably to the inside member by connecting the second connecting part to the first connecting part. The operating body insertion recess, which causes the variation in wall thickness along the circumferential direction, is provided on the inside member and not the outside member. In other words, since the operating body insertion recess is a factor causing the wall thickness to vary along the circumferential direction, it is provided on the inside member and the ball pushing surface is provided on the outside member, which does not have any variation of wall thickness along the circumferential direction. Consequently, when pressure is applied to the ball pushing unit, the ball pushing surface of the outside member does not readily warp into an oval shape. As a result, the durability of the bearing is less likely to decline due to deformation of the ball pushing surface.

An internally geared hub ball pushing unit in accordance with a second aspect of the present invention is an internally geared hub ball pushing unit according to the first aspect of the present invention, wherein the first connecting part is an externally threaded section and the second connecting part is an internally threaded section that is engage with the externally threaded section. With this ball pushing unit, it is easy to connect the inside member and the outside member together non-rotatably because the two members are connected with a screw-threaded connection.

An internally geared hub ball pushing unit in accordance with a third aspect of the present invention is an internally geared hub ball pushing unit according to the first or second aspect of the present invention, wherein the fitting part is further provided with a rotation prevention protrusion configured to fit into a rotation prevention groove formed in the hub axle. With this ball pushing unit, the inside member is prevented from rotating relative to the hub axle and the position of the operating body insertion recess in the circumferential direction (rotational direction relative to the hub axle) is determined. As a result, the gear change operating body can accomplish gear change operations in a reliable fashion.

An internally geared hub ball pushing unit in accordance with a fourth aspect of the present invention is an internally geared hub ball pushing unit according to anyone of the first to third aspects of the present invention, wherein the inside member has a shorter axial length than the outside member, and is configured to be installed inside of the internal circumferential portion of the outside member from an axially direction. Also the outside member has a contact part configured and arranged to contact an end face of the inside member and an operating body insertion hole configured such that the gear change operating body can be inserted therethrough and turned, the contact part and the operating body insertion hole being arranged on the internal circumferential portion of the outside member. With this ball pushing unit, when the inside member is pressed in order to adjust the pressure on the balls, the outside member is pressed not by the connecting parts but by the end face of the inside member touching against the contact part. As a result, the outside member is pressured in a uniform fashion.

An internally geared hub ball pushing unit in accordance with a fifth aspect of the present invention is an internally geared hub ball pushing unit according to the fourth aspect of the present invention, wherein the ball pushing surface is arranged on the outside member at a position further inward in the axial direction than a position where the contact part is arranged. With this ball pushing unit, the ball pushing surface and the contact part are offset from each other in the axial direction because the ball pushing surface is arranged further inward in the axial direction than the contact part. Consequently, even if the outside member becomes warped when it is pressed at the contact part during an adjustment of the ball pressure, the ball pushing surface is less likely to be affected by the warpage.

An internally geared hub ball pushing unit in accordance with a sixth aspect of the present invention is an internally geared hub ball pushing unit according to the fourth or fifth aspect of the present invention, wherein the operating body insertion hole and the operating body insertion recess have substantially identical internal diameter. With this ball pushing unit, it is not necessary to configure the gear change operation body such that its outside diameter is different at the operating body insertion hole than at the operating body insertion recess.

With the present invention, the operating body insertion recess, which is a factor causing the wall thickness to vary along the circumferential direction, is provided on an inside member and the ball pushing surface is provided on an outside member that does not have any variation of wall thickness along the circumferential direction. Consequently, when pressure is applied to the ball pushing unit, the ball pushing surface of the outside member does not readily warp into an oval shape. As a result, the durability of the bearing is less likely to decline due to deformation of the ball pushing surface.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
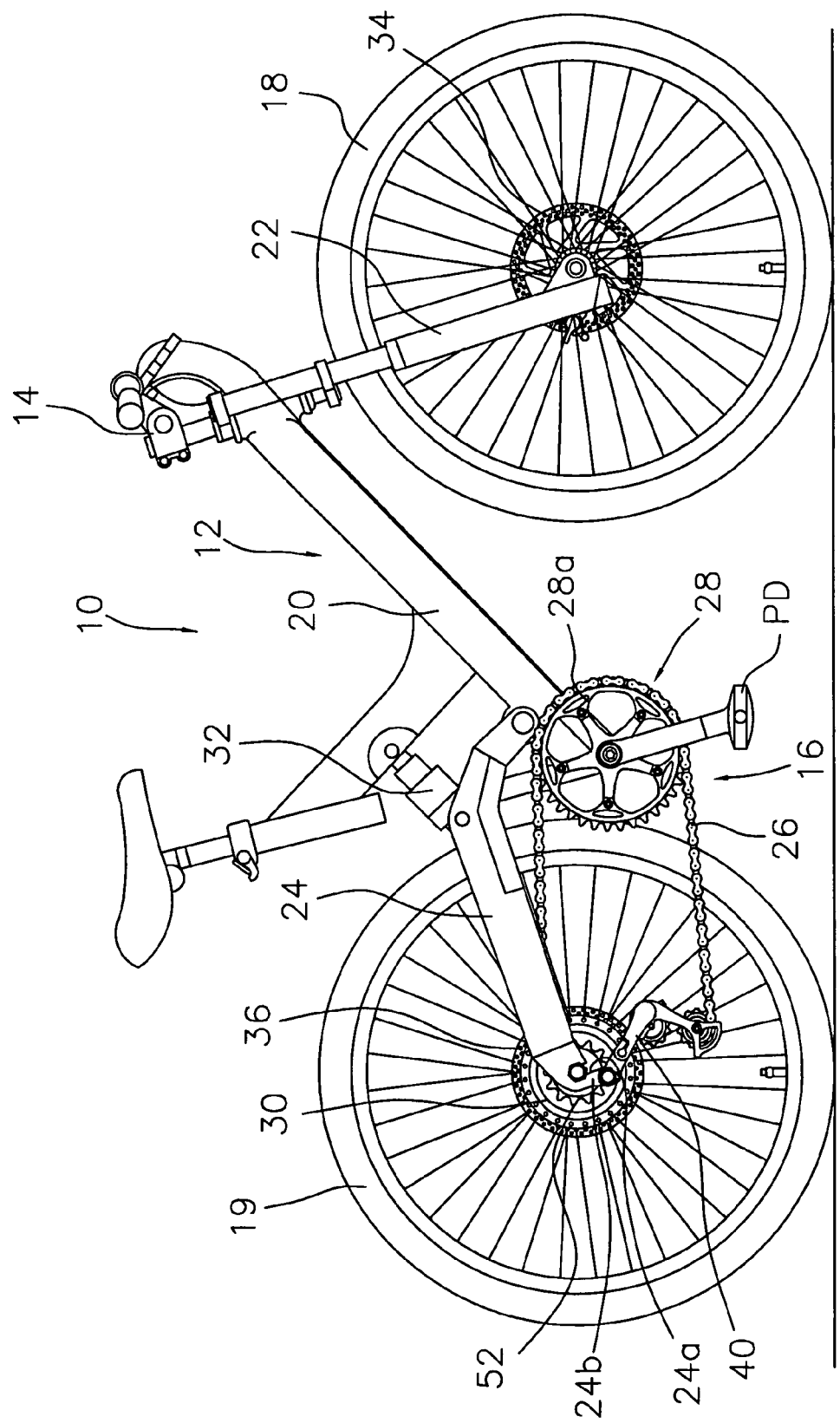
FIG. 1 is a side elevational view of a bicycle that is equipped with an internally geared hub in accordance with one embodiment of the present invention.

Referring initially to FIG. 1, a bicycle 10 is illustrated that is equipped in accordance with a first embodiment of the present invention. The bicycle 10 basically includes a frameset 12, a handlebar unit 14, a drive unit 16, a front wheel 18 and a rear wheel 19. The frameset 12 has a frame 20, a suspension fork 22, and a rear suspension or swing arm 24. The handlebar unit 14 is fastened to the suspension fork 22. The drive unit 16 basically includes a chain 26, a crankset 28, an internally geared rear hub 30, and other components. The crankset 28 includes a pair of pedals PD and a front sprocket 28a. The front wheel 18 is mounted to the suspension fork 22. The rear wheel 19 is mounted to the rear swing arm 24. The suspension fork 22 is mounted to a frontward portion of the frame 20 such that it can rotate freely about an axis that is slanted somewhat from the vertical direction. The rear swing arm 24 has a rear suspension 32 and is mounted to a rearward portion of the frame 20 in such a fashion that it can pivot freely. The rearward ends of the rear swing arm 24 are provides with a plurality of inverted-claw-shaped rear fork ends 24a for mounting the rear wheel 19, and a hanger tab 24b that extends downward from the bottom of each of the rear fork ends 24a.

As shown in FIG. 1, a front disk brake device 34 is mounted to the front wheel 18 and a rear disk brake device 36 is mounted to the rear wheel 19. The internally geared hub 30 is mounted to the rear wheel 19. A chain tensioner 40 is mounted to a hanger tab 24b of the rear swing arm 24 to apply tension to the chain 26.

Figure 2:
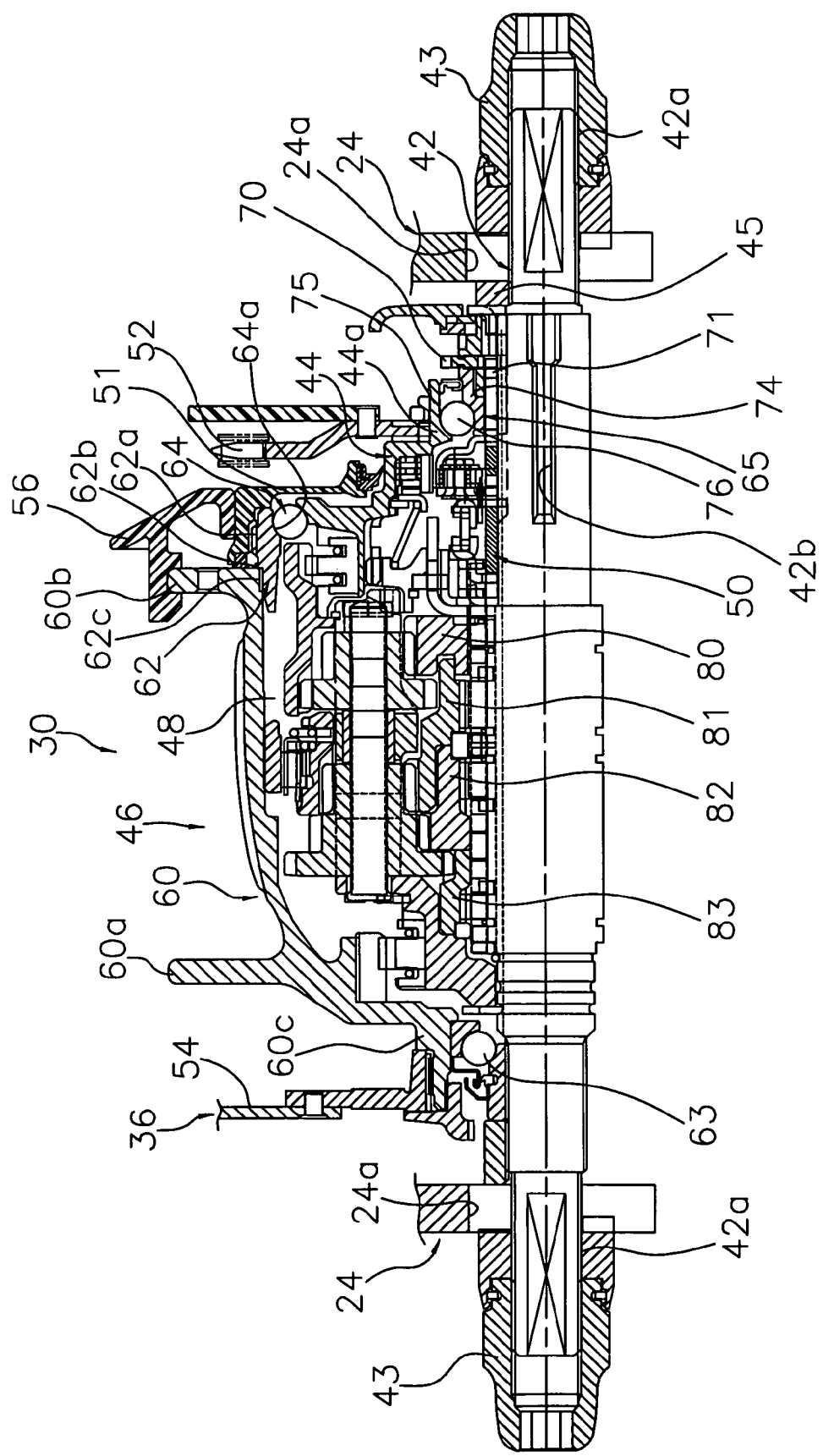
FIG. 2 is a cross sectional view of the internally geared hub of the bicycle illustrated in FIG. 1.

As shown in FIG. 2, the internally geared hub 30 basically includes a hub axle 42 of the rear wheel 19, a generally cylindrical driver 44, a generally cylindrical hub shell 46, a transmission mechanism 48, a gear changing mechanism 50 and a cap member 51 in accordance with an embodiment of the present invention that is installed on an end of the hub shell 46. The hub axle 42 is capable of being fastened to the rear fork ends 24a of the rear swing arm 24. The generally cylindrical driver 44 is mounted on the hub axle 42 in such a fashion that it can rotate freely. The generally cylindrical hub shell 46 is arranged around the outside circumference of the hub axle 42. The transmission mechanism 48 has a planetary gear mechanism configured to transmit forward rotation of the driver 44 to the hub shell 46 through a plurality of power transmission paths. The gear changing mechanism 50 is configured to select one of the power transmission paths at a time. The cap member 51 in accordance with an embodiment of the present invention is installed on an end of the hub shell 46.

The internally geared hub 30 serves as a rear gear changing device and has, for example, eight speeds, i.e., eight power transmission paths. Thus, the internally geared hub 30 can transmit the rotation of the crankset 28 (FIG. 1) to the hub shell 46 using anyone of eight different speeds (gear ratios). A disk rotor 54 for the rear disk break device 36 is mounted on one end of the hub shell (left end in FIG. 2). A hub cover 56 is mounted to the external circumferential surface of the cap member 51.

Figure 3:
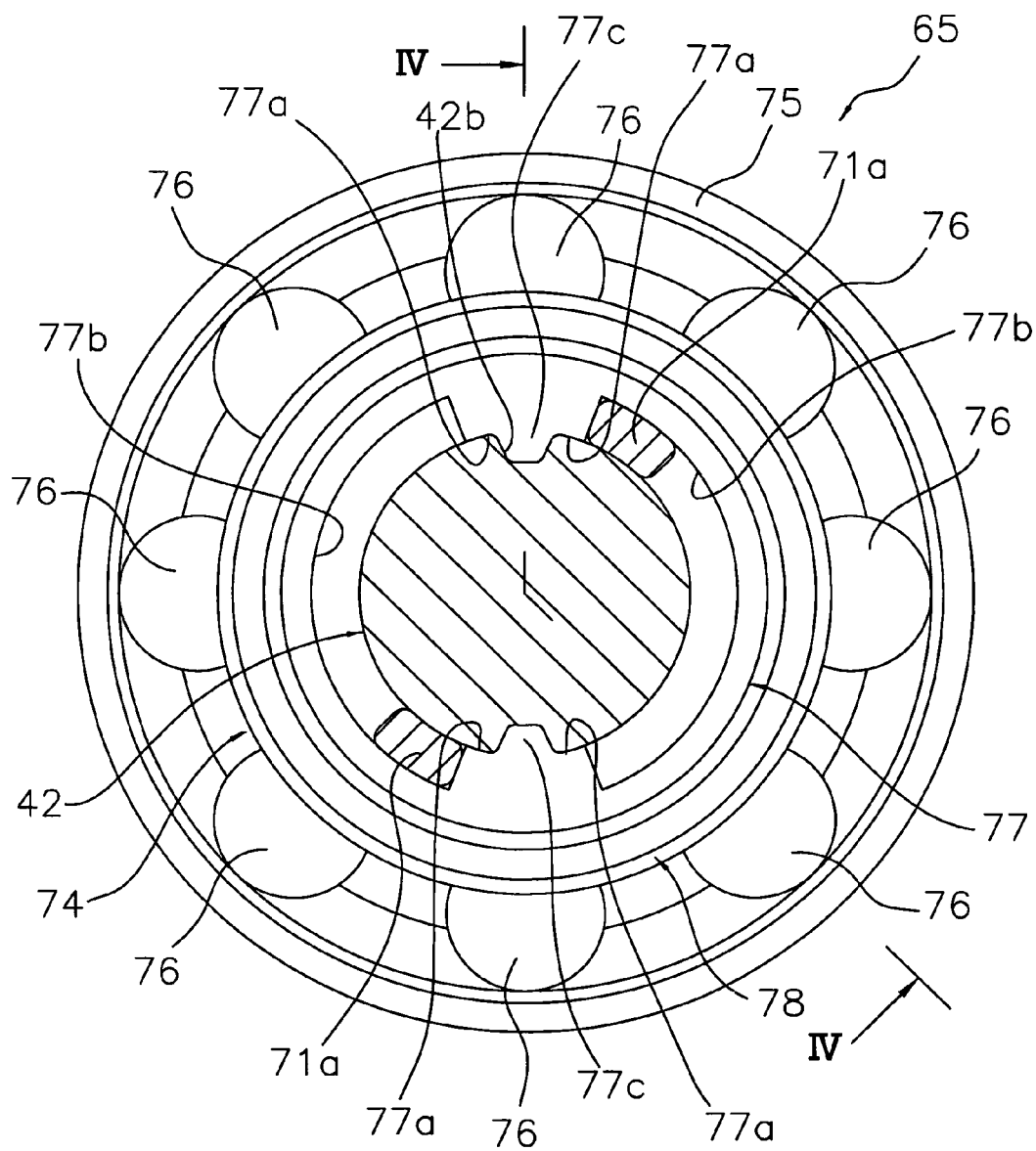
FIG. 3 is an axial end elevational view of a bearing of the internally geared hub in accordance with one embodiment of the present invention.

The hub axle 42 is fastened non-rotatably to the rear fork ends 24a with fastening nuts 43 that are screwed onto both ends of the hub axle 42. Externally threaded sections 42a are provided on both ends of the hub axle 42 for engaging with the fastening nuts 43. On one end of the hub axle 42, i.e., the right-hand end in FIG. 2, a pressing nut 45 is installed on the externally threaded section 42a in addition to the fastening nut 43 for applying pressure to a ball pushing unit 74 (described later). The portion of the hub axle 42 located on the axially inward side of the externally threaded section 42a of the one end of the hub axle 42 (right end in FIG. 2) is larger in diameter than the externally threaded section 42a and has a rotation prevention groove 42b formed therein. As shown in FIG. 3, two rotation prevention grooves 42b are provided in the external circumferential surface of the hub axle 42 at positions arranged along a diameter of the hub axle 42.

The driver 44 has a smaller diameter boss section 44a on one end thereof (right end in FIG. 2). The driver 44 is supported rotatably on the hub axle 42 by a bearing 65 installed in the boss section 44a. The rear sprocket 52 is attached non-rotatably to the driver 44. The hub shell 46 includes a shell body 60 and a cylindrical member 62. The shell body 60 has a pair (left-right) of hub flanges 60a and 60b. The cylindrical member 62 is connected non-rotatably to an internal circumferential surface of one end of the shell body 60 (right end in FIG. 2). The cap member 51 is attached to the external circumferential surface of the cylindrical member 62. The shell body 60 is generally cylindrical in shape. The shell body 60 has a smaller diameter boss section 60c on the other end (left end in FIG. 2) that is rotatably supported on the hub axle 42 by a bearing 63 installed in the boss section 60c. The disk rotor 54 is fastened non-rotatably to the boss section 60c.

As shown in FIG. 2, a ball bearing surface 64a is formed on the internal circumference of the cylindrical member 62 and serves as a portion of a bearing 64 for supporting one end of the hub shell 46 in a freely rotatable fashion on the driver 44. An externally threaded section 62a and an annular protrusion 62b and serrations 62c that are arranged axially inward relative to the externally threaded section 62a are formed on the external circumference of the cylindrical member 62. The cap member 51 is screwed onto the externally threaded section 62a and thereby fastened in place. The one end of the shell body 60 touches against the annular protrusion 62b, thereby positioning the shell body 60 and the cylindrical member 62 relative to each other. The serrations 62c serve to fasten the cylindrical member 62 to the internal circumferential surface of the one end of the shell body 60.

The gear changing mechanism 50 serves to control the on-off status of the sun gears 80 to 83 (four in this example) of the planetary gear mechanism of the transmission mechanism 48, where "on" refers to a state in which the sun gear cannot rotate relative to the hub axle 42 and "off" refers to a state in which the sun gear can rotate freely relative to the hub axle 42. The gear changing mechanism 50 basically comprises a cable anchoring body 70 and a cam sleeve 71. The cable anchoring body 70 is mounted on the hub axle 42 in such a fashion that it can turn freely there-about. The cable anchoring body 70 also has a gear shifting cable (not shown) anchored thereto. The cam sleeve 71 is configured and arranged to turn about the hub axle 42 when the cable anchoring body 70 turns about the hub axle 42. The cam sleeve 71 serves as a gear change operating body for executing gear change operations. The cam sleeve 71 is mounted on the external circumferential surface of the hub axle 42 in such a fashion that it can turn freely and has such a length that it can extend from the position where it engages with the cable anchoring body 70 to a position where it faces opposite the sun gear 83. The mechanism is configured such that the cam sleeve 71 turns about the hub axle 42 in eight steps of, for example, 15 degrees each.

Figure 4:
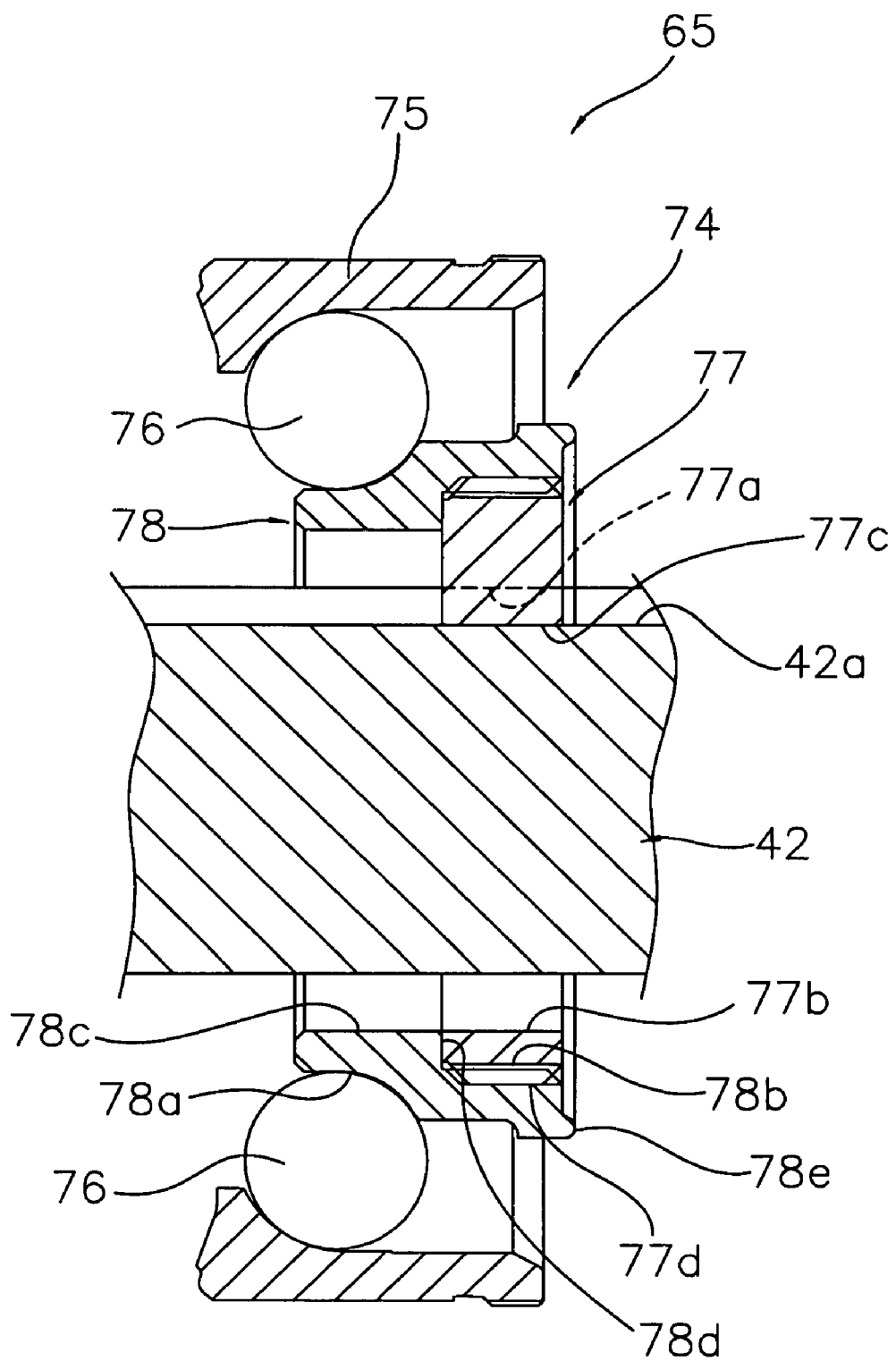
FIG. 4 is a cross sectional view of the bearing of the internally geared hub as seen along section line IV-IV of FIG. 3.
Figure 5:
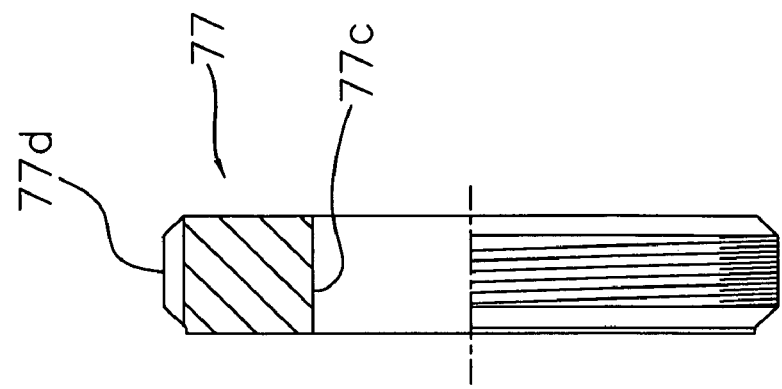
FIG. 5 is a half-cross-sectional view of the inside member of the bearing for the internally geared hub in accordance with one embodiment of the present invention.
Figure 6:
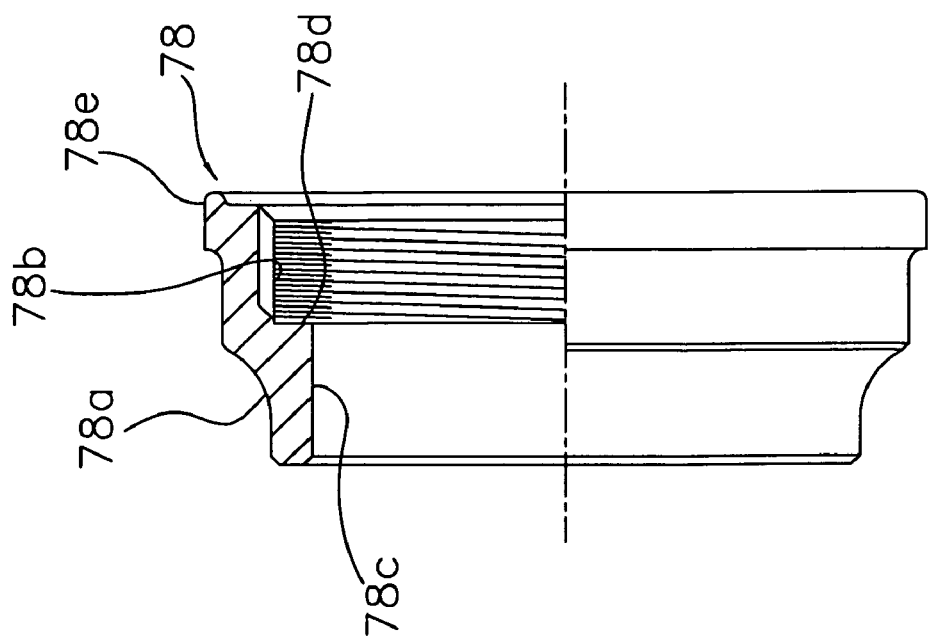
FIG. 6 is a half-cross-sectional view of the outside member of the bearing for the internally geared hub in accordance with one embodiment of the present invention.

As shown in FIGS. 3 and 4, the bearing 65 of one embodiment of the present invention has a ball bearing support 75, a plurality of (e.g., eight) spherical balls 76 and a ball pushing unit 77. The ball pushing unit 77 is mounted on the hub axle 42. The ball bearing support 75 is formed as an integral part of the boss section 44a of the driver 44. The spherical balls 76 are arranged to roll while in contact with both the ball pushing unit 74 and the ball bearing support 75. The balls 76 are held by a retainer (not shown) such that they maintain an equal spacing therebetween in the circumferential direction.

As shown in FIG. 2, the pressure that a ball pushing unit 74 in accordance with an embodiment of the present invention applies to the balls 76 can be adjusted by turning the pressing nut 45, the pressure of the pressing nut being transferred to the ball pushing unit 74 through the cable anchoring body 70. As shown in FIGS. 3 to 6, the ball pushing unit 74 has an inside member 77 mounted to the hub axle 42 and an outside member that is connected non-rotatably to the outside circumference of the inside member 77.

The inside member 77 is a thick, ring-shaped member made of metal. The inside member 77 has two fitting parts 77a, two sleeve insertion recesses 77b and two rotation prevention protrusions 77c. The two fitting parts 77a are configured to fit onto the hub axle 42. The two sleeve insertion recesses 77b (exemplifying operating body insertion recesses) are configured such that the cam sleeve 71 can pass therethrough and turn there-within. The two rotation prevention protrusions 77c are configured to engage with the rotation prevention grooves 42b of the hub axle 42. The inside member 77 has an externally threaded section 77d that serves as a first connecting part on the external circumferential surface thereof. The axial dimension (length) of the inside member 77 is shorter than that of the outside member 78 and the inside member 77 is configured to be installed into an internal circumferential portion of the outside member from an axially outside direction (i.e., from the right when viewed as shown in FIG. 2). The connection between the inside member 77 and the hub axle 42 is non-rotatable due to the engagement of the rotation prevention protrusions 77c with the rotation prevention grooves 42b. Since the hub axle 42 is fastened non-rotatably to the rear fork ends 24a, the inside member 77 is not rotatable with respect to the frameset 12. Each of the two fitting parts 77a has the shape of a circular arc with such an internal diameter that the fitting parts 77a fit on the hub axle 42 with a slight gap. The two fitting parts 77a are arranged in positions along a diameter of the internal circumferential surface. The rotation prevention protrusions 77c are arranged generally in the middle of the fitting parts 77a, and configured to protrude radially inward from the fitting parts 77a. Consequently, each of the fitting parts 77a is arranged on both sides of the respective rotation prevention protrusion 77c. Each of the sleeve insertion recesses 77b is a circular arc-shaped recessed portion formed between the fitting parts 77a with a length that is slightly larger than the thickness of the cam sleeve 71. The length of the sleeve insertion recesses 77b in the circumferential direction is such that sleeve insert portions 71a of the cam sleeve 71 can turn through eight steps of 15 degrees each within the sleeve insertion recesses 77b. In this embodiment, each of the sleeve insertion recesses 77b has an angular length of, for example, approximately 140 degrees about the center axis of the hub axle 42. As result, the cam sleeve 71 designed to turn through eight steps of 15 degrees each can pass through the sleeve insertion recesses 77b and turn there-within.

The outside member 78 has a cone shaped ball pushing surface 78a on an external circumferential portion thereof and an internally threaded section 78b on an internal circumferential portion thereof. The internally threaded section 78b serves as a second connecting part that is configured to be non-rotatably connected to the externally threaded section 77d (the first connecting part). The outside member 78 also has a sleeve passage hole 78c (exemplifying an operating body insertion hole) configured such that the cam sleeve 71 can be inserted there-through and turned and a contact part 78d configured and arranged for an end face of the inside member 77 to touch there-against. The sleeve passage hole 78c and the contact part 78d are provided in internally circumferential portions of the outside member 78. The internally threaded section 78b has a larger diameter than the sleeve passage hole 78c, and the contact part 78d comprises a flat surface that is formed at the boundary between the internally threaded section 78b and the sleeve passage hole 78c and lies in a plane perpendicular to the center axis of the hub axle 42. The ball pushing surface 78a is arranged further inward in the axial direction than the contact part 78d so that the contact part 78d and the ball pushing surface 78a are offset from each other in the axial direction. As a result, even if the outside member 78 becomes warped when it is pressed at the contact part 78d during an adjustment of the ball pressure, the ball pushing surface 78a will not be readily affected by the warpage. The internal diameter of the sleeve passage hole 78c is substantially the same as the internal diameter of the sleeve insertion recesses 77b. An outer circumferential portion of one end face of the outside member 78 protrudes outward in the axial direction. This protruding portion 78e fits onto the cable anchoring body 70. When the outside member 78 is screw-fastened onto the inside member 77 the axially outward facing end faces of the two members 77, 78 are arranged at the same position relative to the axial direction. Thus, the axial length of the inside member is substantially the same as the axial distance from the outward end face of the outside member 78 (excluding the protruding portion 78e) to the contact part 78d. As a result, the cable anchoring body 70 can contact the end faces of both members 77 and 78 and both members 77 and 78 are pressed simultaneously when the ball pressure is adjusted.

Before a ball pushing unit 74 configured as described heretofore is installed on a hub axle 42, first the inside member 77 is screwed into and fastened to the outside member 78. After the members of the internally geared hub 30 shown to the left of the ball pushing unit 74 in FIG. 2 are assembled, the spherical balls 76 are arranged on the ball bearing support 75 (which is formed as an integral portion of the driver 44) with the circumferential spacing between the balls established by the retainer. The pre-assembled ball pushing unit 74 obtained by screwing the inside member 77 into the outside member 78 is mounted to the hub axle 42. Then, the cable anchoring body 70 and the pressing nut 45 are installed onto the hub axle 42. After all of the aforementioned components have been installed onto the hub axle 42, the pressing nut is used to adjust the overall ball pressure. Since the wall thickness of the outside member 78 does not vary along the circumferential direction, even if warping occurs due to the pressure of the pressing nut 45, the cross sectional shape of the ball pushing surface 78a in a plane perpendicular to the hub axle 42 will not readily deform from a circular shape to an oval shape. Furthermore, since the ball pushing surface 78a is arranged further inward in the axial direction than the contact part 78d and since there is some play between the externally threaded section 77d and the internally threaded section 78b, deformation of the inside member 77 will not readily affect the ball pushing surface 78a in the event the cross sectional shape of the inside member 77 should warp into an oval shape (which the inside member 77 is more likely to do because its wall thickness varies along its circumference due to the sleeve insertion recesses 77b).

Figure 7:
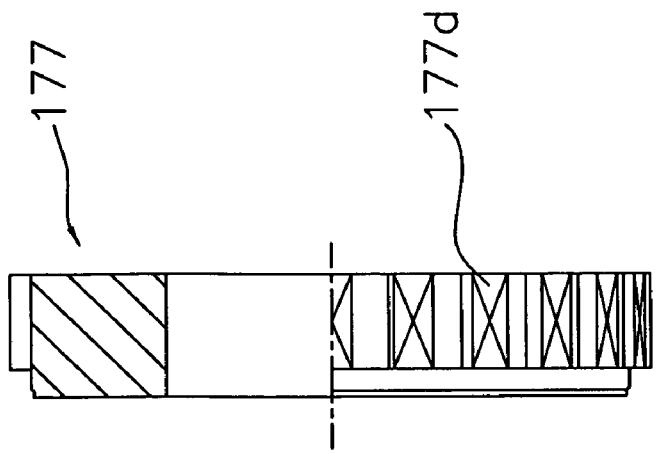
FIG. 7 is a half-cross-sectional view, similar to FIG. 5, of an inside member of a bearing for an internally geared hub in accordance with another embodiment of the present invention.
Figure 8:
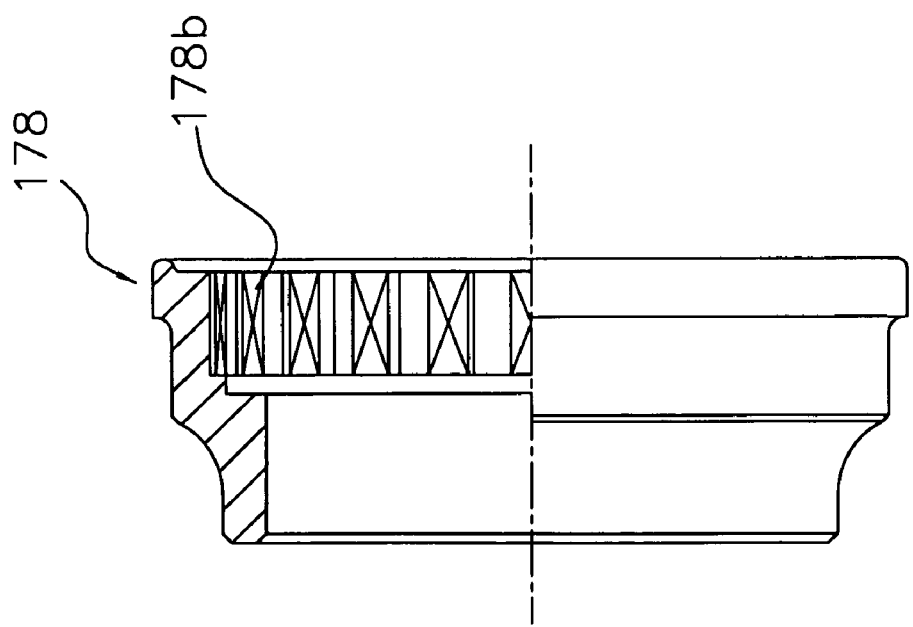
FIG. 8 is a half-cross-sectional view, similar to FIG. 6, showing another embodiment of the present invention of an outside member that is used with the inside member illustrated in FIG. 7 of a bearing for an internally geared hub in accordance with another embodiment of the present invention.

Although in the previously described embodiment, the axial length of the outside member 78 is longer than the axial length of the inside member 77, it is also acceptable if the inside member and the outside member have the same axial length. Moreover, although in the previously described embodiment, the first connecting part and the second connecting part comprise an externally threaded section and an internally threaded section, the first and second connecting parts can be configured in any manner so long as they connect the inside member and the outside member together in a non-rotatable fashion. For example, as shown in FIGS. 7 and 8, the first connecting member can be a plurality of first protrusions 177d formed on the external circumferential surface of the inside member 177 so as to be spaced apart from one another in the circumferential direction and the second connecting member can be a plurality of second protrusions 178d formed on the internal circumferential surface of the outside member 178 so as to be spaced apart from one another in the circumferential direction, the first and second protrusions 177d and 178d being configured to mesh with each other so as to accomplish a non-rotatable connection between the inside member 177 and the outside member 178. In this embodiment, the constituent features other than the connecting parts are the same as in the previous embodiment and explanations thereof are omitted for the sake of brevity. It is also acceptable to use a connection structure comprising a key and a key way or a connection structure using polygonal internal and external circumferential shapes that engage non-rotatably with each other.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An internally geared hub ball pushing unit comprising:
   an inside member including an annular fitting part configured to be fitted onto a hub axle, an operating body insertion recess disposed on an internal circumferential portion of the inside member and a first connecting part disposed on an external circumferential portion of the inside member, the operating body insertion recess having a circular arc shape and being configured to receive a gear change operating body serving to facilitate gear change operations; and
   an outside member having a ball pushing surface disposed on an external circumferential portion of the outside member to contact a spherical body of a bearing and a second connecting part disposed on an internal circumferential portion of the outside member, the second connecting part of the outside member being non-rotatably connected to the first connecting part of the inside member.

2. The internally geared hub ball pushing unit as recited in claim 1, wherein
   the first connecting part is an externally threaded section and the second connecting part is an internally threaded section that is engage with the externally threaded section.

3. The internally geared hub ball pushing unit as recited in claim 2, wherein
   the fitting part is further provided with a rotation prevention protrusion configured to fit into a rotation prevention groove formed in the hub axle.

4. The internally geared hub ball pushing unit as recited in claim 2, wherein
   the inside member has a shorter axial length than the outside member, and is configured to be installed inside of the internal circumferential portion of the outside member from an axially direction; and
   the outside member has a contact part configured and arranged to contact an end face of the inside member and an operating body insertion hole configured such that the gear change operating body can be inserted therethrough and turned, the contact part and the operating body insertion hole being arranged on the internal circumferential portion of the outside member.

5. The internally geared hub ball pushing unit as recited in claim 4, wherein
   the ball pushing surface is arranged on the outside member at a position further inward in the axial direction than a position where the contact part is arranged.

6. The internally geared hub ball pushing unit as recited in claim 1, wherein
   the fitting part is further provided with a rotation prevention protrusion, configured to fit into a rotation prevention groove formed in the hub axle.

7. The internally geared hub ball pushing unit as recited in claim 1, wherein
   the inside member has a shorter axial length than the outside member, and is configured to be installed inside of the internal circumferential portion of the outside member from an axially direction; and
   the outside member has a contact part configured and arranged to contact an end face of the inside member and an operating body insertion hole configured such that the gear change operating body can be inserted therethrough and turned, the contact part and the operating body insertion hole being arranged on the internal circumferential portion of the outside member.

8. The internally geared hub ball pushing unit as recited in claim 7, wherein
the ball pushing surface is arranged on the outside member at a position further inward in the axial direction than a position where the contact part is arranged.

9. The internally geared hub ball pushing unit as recited in claim 8, wherein
the operating body insertion hole and the operating body insertion recess have substantially identical internal diameter.

10. The internally geared hub ball pushing unit as recited in claim 7, wherein
the operating body insertion hole and the operating body insertion recess have substantially identical internal diameter.

11. An internally geared hub comprising:
a hub axle configured and arranged to be fastened to a frame of a bicycle;
a driver mounted in a freely rotatable manner to the hub axle by a first bearing and the driver having an external circumferential sprocket mounting portion;
a hub shell rotatably supported around an outside circumference of the hub axle by a second bearing and rotatably supported on the driver by a third bearing;
a transmission mechanism operatively disposed between the hub shell and the driver to provide a plurality of power transmission paths therebetween; and
a gear changing mechanism operatively coupled to the transmission mechanism configured to select one of the power transmission paths at a time; and
the first bearing including a ball bearing support, a plurality of spherical balls and a ball pushing unit, the ball pushing unit including
an inside member including an annular fitting part fitted onto the hub axle, an operating body insertion recess disposed on an internal circumferential portion of the inside member and a first connecting part disposed on an external circumferential portion of the inside member, the operating body insertion recess having a circular arc shape and being configured to receive a gear change operating body of the gear changing mechanism; and
an outside member having a ball pushing surface disposed on an external circumferential portion of the outside member to contact the spherical balls and a second connecting part disposed on an internal circumferential portion of the outside member, the second connecting part of the outside member being non-rotatably connected to the first connecting part of the inside member.

12. The internally geared hub as recited in claim 11, wherein
the first connecting part is an externally threaded section and the second connecting part is an internally threaded section that is engage with the externally threaded section.

13. The internally geared hub as recited in claim 12, wherein
the fitting part is further provided with a rotation prevention protrusion configured to fit into a rotation prevention groove formed in the hub axle.

14. The internally geared hub as recited in claim 12, wherein
the inside member has a shorter axial length than the outside member, and is configured to be installed inside of the internal circumferential portion of the outside member from an axially direction; and
the outside member has a contact part configured and arranged to contact an end face of the inside member and an operating body insertion hole configured such that the gear change operating body can be inserted therethrough and turned, the contact part and the operating body insertion hole being arranged on the internal circumferential portion of the outside member.

15. The internally geared hub as recited in claim 14, wherein
the ball pushing surface is arranged on the outside member at a position further inward in the axial direction than a position where the contact part is arranged.

16. The internally geared hub as recited in claim 11, wherein
the fitting part is further provided with a rotation prevention protrusion configured to fit into a rotation prevention groove formed in the hub axle.

17. The internally geared hub as recited in claim 11, wherein
the inside member has a shorter axial length than the outside member, and is configured to be installed inside of the internal circumferential portion of the outside member from an axially direction; and
the outside member has a contact part configured and arranged to contact an end face of the inside member and an operating body insertion hole configured such that the gear change operating body can be inserted therethrough and turned, the contact part and the operating body insertion hole being arranged on the internal circumferential portion of the outside member.

18. The internally geared hub as recited in claim 17, wherein
the ball pushing surface is arranged on the outside member at a position further inward in the axial direction than a position where the contact part is arranged.

19. The internally geared hub as recited in claim 18, wherein
the operating body insertion hole and the operating body insertion recess have substantially identical internal diameter.

20. The internally geared hub as recited in claim 17, wherein
the operating body insertion hole and the operating body insertion recess have substantially identical internal diameter.

* * * * *